(12) United States Patent
Nagasaka

(10) Patent No.: US 7,903,882 B2
(45) Date of Patent: Mar. 8, 2011

(54) IMAGE MANAGEMENT DEVICE

(75) Inventor: Fumio Nagasaka, Ueda (JP)

(73) Assignee: Seiko Epson Corporation, Tokyo (JP)

( * ) Notice: Subject to any disclaimer, the term of this patent is extended or adjusted under 35 U.S.C. 154(b) by 30 days.

(21) Appl. No.: 11/800,836

(22) Filed: May 8, 2007

(65) Prior Publication Data

US 2007/0269140 A1    Nov. 22, 2007

(30) Foreign Application Priority Data

May 9, 2006   (JP) ................................. 2006-130316

(51) Int. Cl.
*G06K 9/62* (2006.01)
(52) U.S. Cl. ......................................... 382/224; 707/708
(58) Field of Classification Search ................... 382/100, 382/155, 159, 168, 170, 190, 195, 181, 224–229; 707/1, 3, 4, 6, 100, 101, 102
See application file for complete search history.

(56) References Cited

U.S. PATENT DOCUMENTS

| | | | | |
|---|---|---|---|---|
| 5,561,796 A * | 10/1996 | Sakamoto et al. | ................ | 707/3 |
| 5,802,361 A * | 9/1998 | Wang et al. | ................... | 382/217 |
| 6,202,068 B1 * | 3/2001 | Kraay et al. | .................. | 707/102 |
| 6,240,423 B1 * | 5/2001 | Hirata | ......................... | 707/104.1 |
| 6,629,104 B1 * | 9/2003 | Parulski et al. | ............... | 707/102 |
| 6,757,684 B2 * | 6/2004 | Svendsen et al. | ............... | 707/10 |
| 6,795,818 B1 * | 9/2004 | Lee | ..................... | 707/3 |
| 6,804,684 B2 * | 10/2004 | Stubler et al. | ............. | 707/104.1 |
| 6,907,141 B1 * | 6/2005 | Okamoto | ...................... | 382/225 |
| 2002/0188602 A1 * | 12/2002 | Stubler et al. | ..................... | 707/3 |
| 2004/0126038 A1 * | 7/2004 | Aublant et al. | ............... | 382/305 |
| 2007/0239683 A1 * | 10/2007 | Gallagher | ........................ | 707/3 |

FOREIGN PATENT DOCUMENTS

| JP | 2005-6085 | 1/2005 |
|---|---|---|
| JP | 2005-18734 | 1/2005 |

* cited by examiner

*Primary Examiner* — Anand Bhatnagar
(74) *Attorney, Agent, or Firm* — Nutter McClennen & Fish LLP; John J. Penny, Jr.

(57) ABSTRACT

The image management device includes a related image selection module and an auxiliary labeling module. The related image selection module selects one or more related images having a certain relationship to a classification labeled image which is assigned a classification label indicating image classification. The auxiliary labeling module assigns an auxiliary label to the related images, the auxiliary label indicating the certain relationship.

10 Claims, 11 Drawing Sheets

Fig.5

```
                                              (LINK FILE)

LIST OF IMAGES ASSIGNED ⎧  <XML:LABEL_TAG:Picnic>
1ST LABEL              ⎨   "IMG006.jpg","IMG210.jpg","IMG366.jpg"
(PICNIC)               ⎩  </XML:LABEL_TAG>
         MAIN IMAGE {     <File name = "IMG006.jpg">
LIST OF IMAGES ASSIGNED ⎧  <Label id="2">
2ND LABEL              ⎨   "IMG003.jpg","IMG007.jpg"
                       ⎩  </Label>
LIST OF IMAGES ASSIGNED ⎧  <Label id="3">
3RD LABEL              ⎨   "IMG002.jpg","IMG003.jpg","IMG007.jpg"
                       ⎩  </Label>
LIST OF IMAGES ASSIGNED ⎧  <Label id="4">
4TH LABEL              ⎨   "IMG002.jpg","IMG003.jpg","IMG004.jpg","IMG005.jpg",
                       ⎩   "IMG007.jpg","IMG008.jpg","IMG009.jpg"
                          </Label>
LIST OF IMAGES ASSIGNED ⎧  <Label id="5">
5TH LABEL              ⎨   "IMG001.jpg","IMG002.jpg","IMG003.jpg","IMG004.jpg",
                       ⎩   "IMG005.jpg","IMG007.jpg","IMG008.jpg","IMG009.jpg",
                           "IMG010.jpg"
                          </Label>
                          </File>
         MAIN IMAGE {     <File name = "IMG210.jpg">
                               •
                               •
                               •
```

IMAGE MANAGEMENT DEVICE

CROSS REFERENCE TO RELATED APPLICATIONS

The present application claims the priority based on Japanese Patent Application No. 2006-130316 filed on May 9, 2006, the disclosure of which is hereby incorporated by reference in its entirety.

BACKGROUND OF THE INVENTION

1. Field of the Invention

The present invention relates to a technique for assigning labels to a plurality of images.

2. Description of the Related Art

Recently, many images have been photographed by photographing devices such as digital still cameras and mobile telephones equipped with cameras. The images photographed by such devices are often stored on and managed by personal computers, and are displayed on display devices or printed by printers. The increased capacity of recording media such as hard disks has led to the storage of hundreds, even thousands, of images on personal computers. It is extremely cumbersome for users to search for the desired image among such an abundance of images in order to print or display them. Image management methods have been proposed, in which labels that serve as cues (such as labels indicating the category of the image contents) during such searches are pre-assigned to allow images to be searched based on such labels (see JP2005-18734A).

When a label is pre-assigned to an image in the manner noted above, the user, for example, decides whether or not to assign a label while checking the images one by one, and if several types of labels can be assigned, it is necessary to decide which type of label to assign, which is extremely tedious.

SUMMARY OF THE INVENTION

An object of the invention is to provide a technique allowing labels to be assigned to a plurality of images in a simple manner.

According to one aspect of the present invention, there is provided an image management device for managing a plurality of images. The image management device includes: a related image selection module configured to select one or more related images having a certain relationship to a classification labeled image which is assigned a classification label indicating image classification. The image management device further includes an auxiliary labeling module configured to assign an auxiliary label to the related images, the auxiliary label indicating the certain relationship.

In the image management device, related images having a certain relation to the classification labeled image are selected, and an auxiliary label is assigned to the related images, thereby substantially alleviating the burden on the user in assigning labels.

The present invention can be implemented in a variety of embodiments, such as methods for managing images, computer programs for executing the functions of image management methods or image management devices, recording media on which such computer programs are stored.

These and other objects, features, aspects, and advantages of the present invention will become more apparent from the following detailed description of the preferred embodiments with the accompanying drawings.

BRIEF DESCRIPTION OF THE DRAWINGS

FIG. 5 illustrates the contents of the link file LF.

DESCRIPTION OF THE PREFERRED EMBODIMENT

Best modes for implementing the invention are illustrated by embodiments in the following sequence.

A. Embodiments
B. Variants

A. Embodiments

A1. Device Structure

Figure 1:
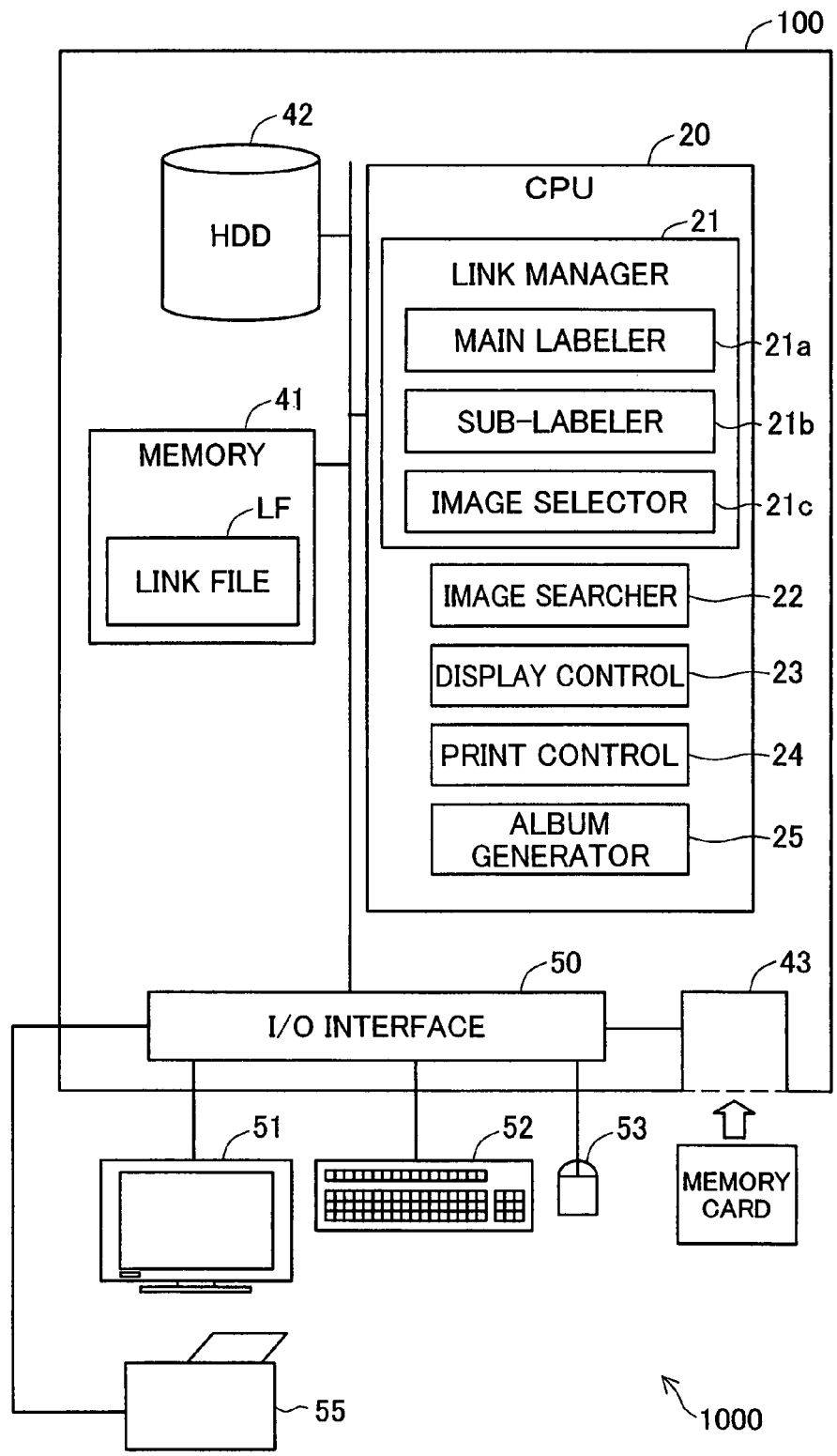
FIG. 1 schematically illustrates the structure of an image management system in an example of the invention.

FIG. 1 schematically illustrates the structure of an image management system embodying the present invention. The image management system 1000 comprises a computer 100, display 51, keyboard 52, mouse 53, and printer 55. The computer 100 comprises a CPU 20, hard disk 42, memory 41, memory card slot 43, and I/O interface 50, each of which is connected by internal buses. The I/O interface 50 comprises a group of interfaces for connecting the display 51, keyboard 52, mouse 53, printer 55, and memory card slot 43 to the computer 100. Link data files LF (described in detail below) are stored in memory 41.

An image management application program is run by the computer 100 under the control of a certain operating system. Various drivers are loaded in the operating system, and are controlled by the above display 51, keyboard 52, mouse 53, printer 55, and memory card slot 43. When the image management application program is started and loaded into memory 41, the CPU 20 runs the application program, functioning as a link manager 21, as well as an image searcher 22, display control 23, print control 24, and album generator 25, respectively. The link manager 21 comprises a main labeling module 21a, sub-labeling module 21b, and image selector 21c.

The computer 100 corresponds to the image management device in the claims, the main labeler 21a corresponds to the classification labeling module in the claims, the sub-labeler 21b corresponds to the auxiliary labeling module in the claims, the image selector 21c corresponds to the relating image selecting module in the claims, and the link files LF correspond to the label description files in the claims.

In the image management system 1000, images photographed by a digital still camera are read into the computer 100 via a memory card and are stored on the hard disk 42. At this time, a group of image data stored on the memory card is stored in a folder named by the date on which it was read into the computer 100, and is placed on the hard disk 42. The user can select images from the image groups stored on the hard disk 42 to display them on the display 51, print them on the printer 55, and create what is referred to as an electronic album. In creating an electronic album, for example, the user selects images to be included in the album while viewing thumbnails displayed on the display 51. The image searcher 22 searches the image data of the selected images in the hard disk 42. The album generator 25 creates an electronic album, based on the searched image data and their file names, and stores information related to the album, such as the image data file names, in memory 41.

In the image management system 1000, additional information or labels serving as cues during the search are assigned to the stored images. The labels includes main labels which indicate the category of stored images, and sub-labels for use in searching images related to those images that have been assigned the main labels (referred to below as "main images"). Main labels are assigned to images designated by the user, and sub-labels are automatically assigned in the image management system 1000. The main labels correspond to the classification labels in the claims, and the sub-labels correspond to the auxiliary labels in the claims.

A2. Labeling Process

Figure 2:
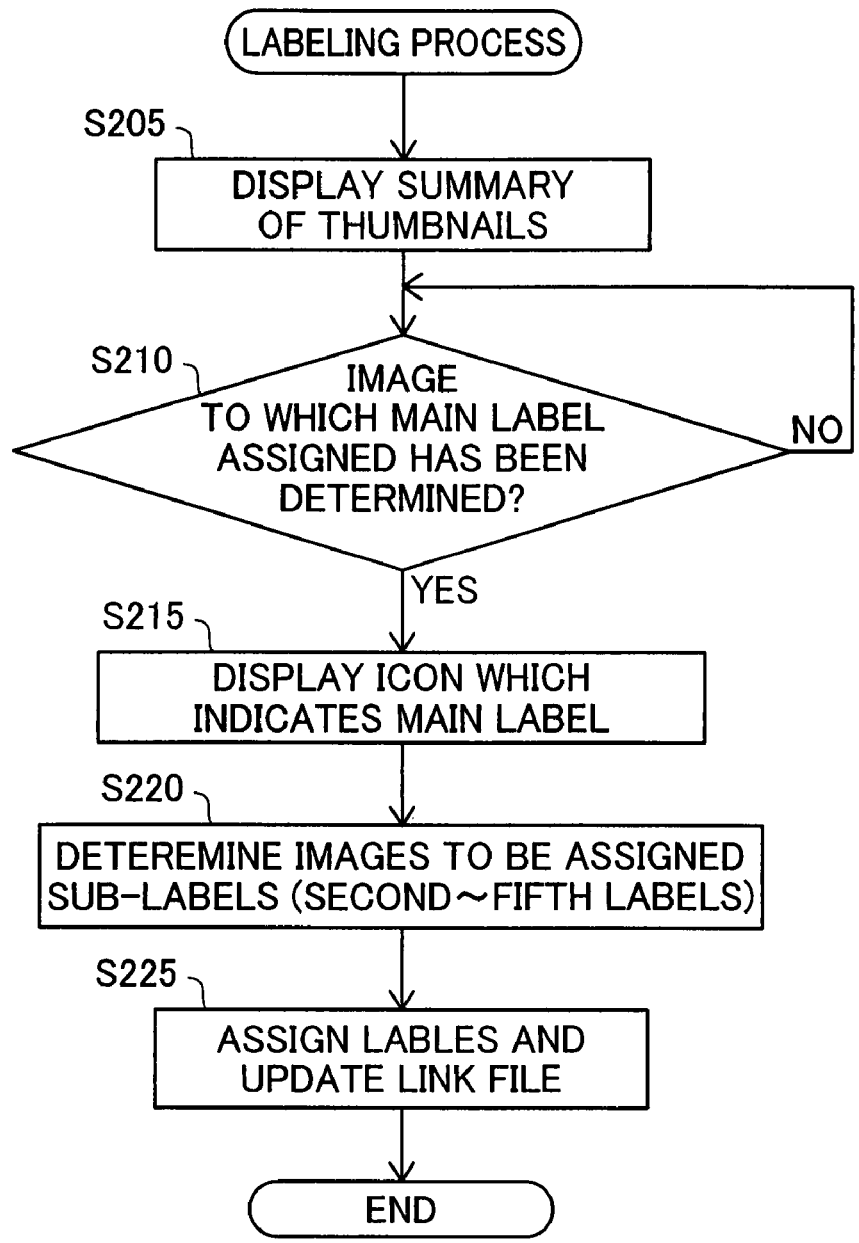
FIG. 2 is a flow chart of a label assignment procedure executed by the image management system 1000.

FIG. 2 is a flow chart of a label assignment procedure executed by the image management system 1000. When the user operates the keyboard 52 or mouse 53 to select the labeling menu from the initial menu screen (not shown) displayed on the display 51, the labeling process is run by the image management system 1000.

When the labeling process shown in FIG. 2 is started, the image searcher 22 (FIG. 1) reads thumbnails of all the images stored on the hard disk 42, and the display control 23 displays a list of the thumbnail images on the display 51 (Step S205). The display control 23 then determines if an image that is to be assigned the main label has been determined (Step S210). When an image that is to be assigned a main label is determined, the display control 23 displays an icon showing the main label (referred to below as "label icon") on the display 51 in conjunction with the thumbnail image of the image which has been determined (Step S215).

Figures 3A, 3B:
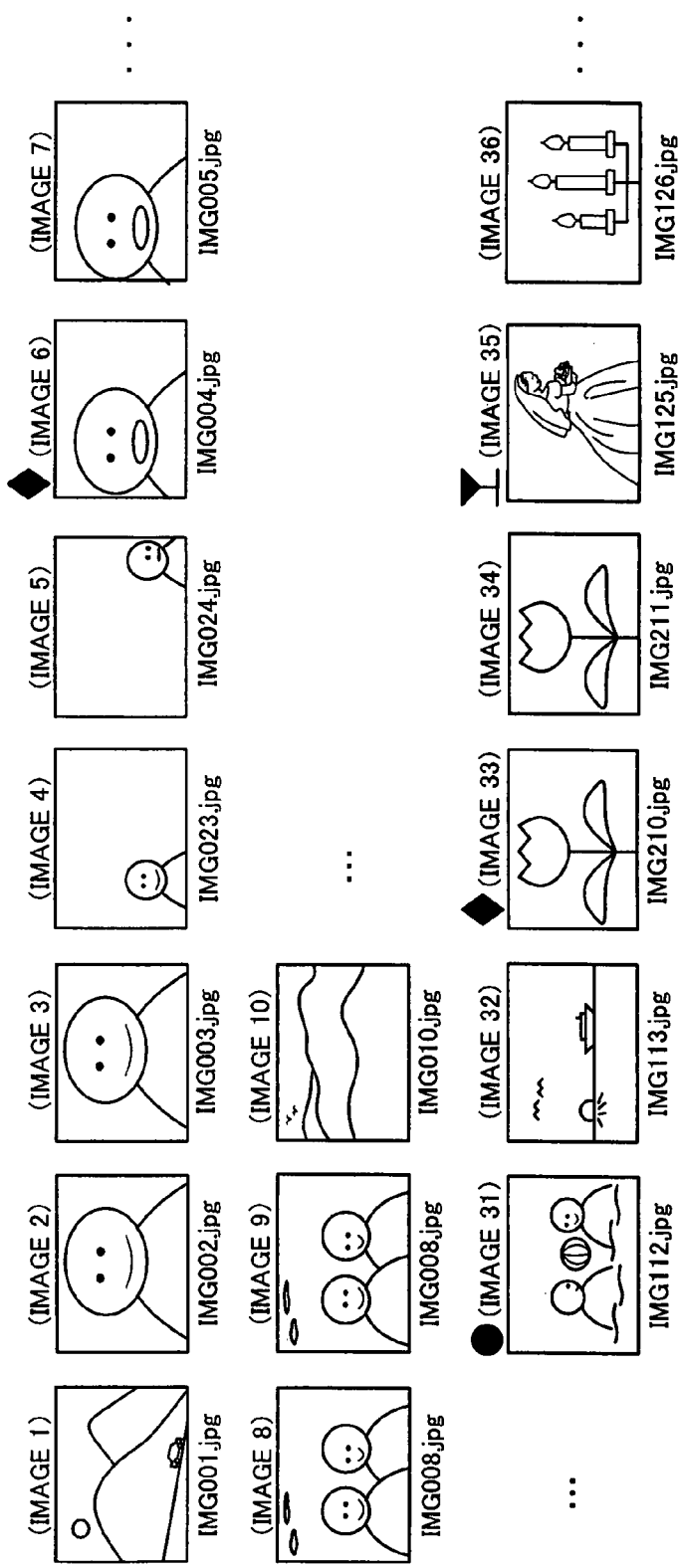
FIGS. 3A and 3B show the categories of main labels assigned by the user, and the thumbnail images and label icons displayed on the display.

FIG. 3A shows the categories of main labels assigned by the user, and FIG. 3B shows the thumbnail images and label icons displayed on the display 51. As illustrated in FIG. 3A, four categories comprising "picnic," "sports," "ceremony," and "family" have been prepared as main labels which the user can assign (referred to below as "first label"). While viewing the thumbnail images displayed on the display 51, the user can select and assign labels suited to the image contents from among the four categories of labels. At this time, the user does not need to assign a first label to all the images. For example, a first label "picnic" may be assigned to only image 6 among the image group (images 1 to 10) taken at a picnic.

In the example illustrated in FIG. 3B, it is determined that a first label "picnic" is to be assigned to image 6 and image 33, a first label "sports" is to be assigned to image 31, and a first label "ceremony" is to be assigned to image 35. Label icons corresponding to the label categories are displayed in conjunction with the thumbnail images for the images which have been assigned the main labels.

When the images which are to be assigned a main label are determined, and the label icon is displayed in conjunction with its thumbnail image, the image selector 21*c* determines images that are to be sub-labeled (Step S220).

Figure 4:
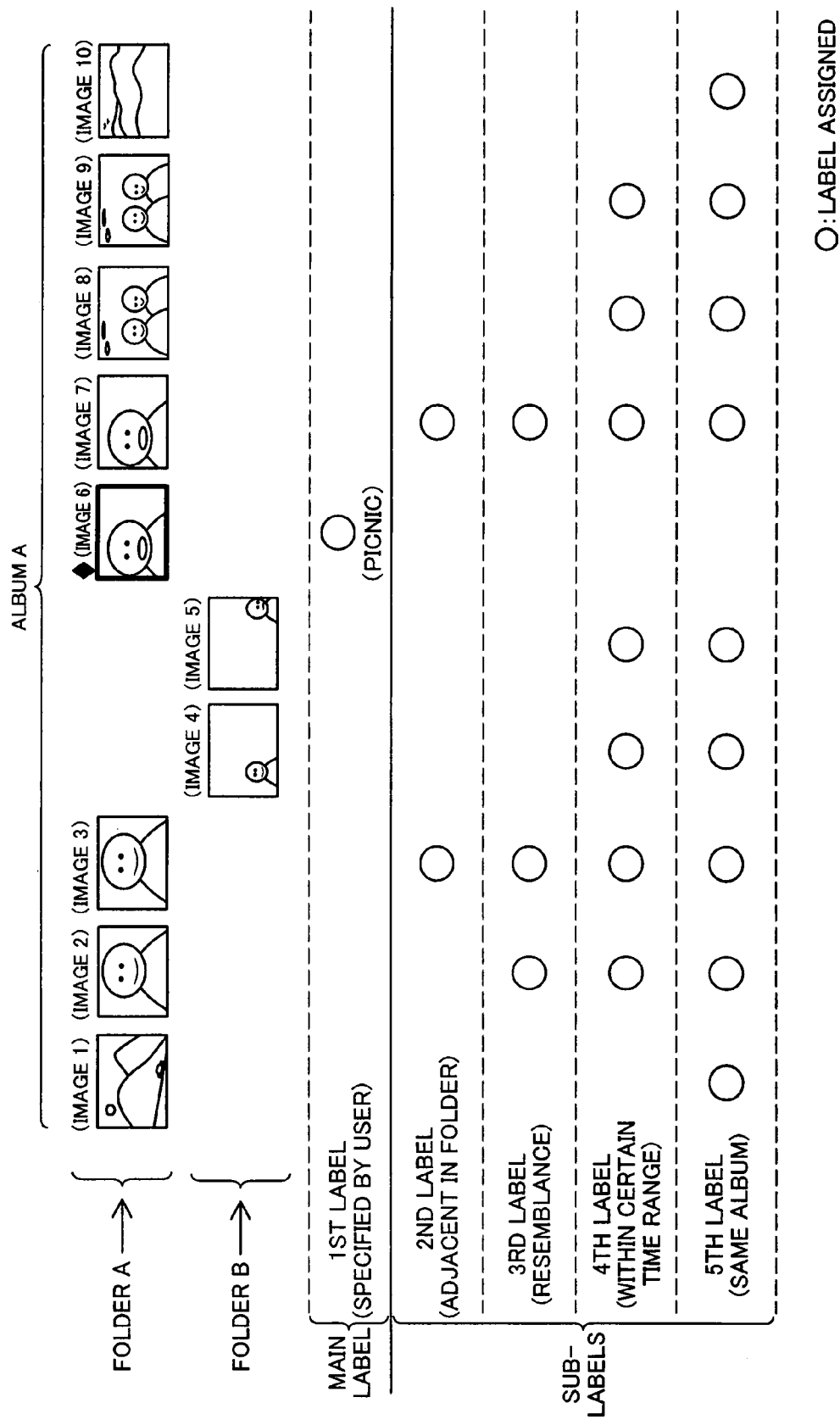
FIG. 4 illustrates an example of an image assigned a sub-label.

FIG. 4 illustrates an example of images which are to be assigned sub-labels. In the example in FIG. 4, images 1 to 10 are to be assigned sub-labels. Images 1 to 10 are lined up in the order they were photographed, and all belong to the same electronic album A. Images 1 to 3 and 6 to 10 are stored in a folder A, and images 4 and 5 are stored in a folder B.

Images in the same album may be stored in different folders A and B under the following circumstances, for example. Assume that two people go on a picnic together, and images taken on the same occasion with two digital still cameras. If the images taken by the two cameras are placed in the same album, the images shoot by the separate cameras are stored in different folders in the hard disk 42.

For each main image, the image selector 21*c* searches images related to the main image under pre-specified conditions, and images that have been found are determined as images that are to be sub-labeled. Specifically, the image selector 21C searches for images matching the condition of "being adjacent to main images in the same folder," and determines that the searched images are to be sub-labeled. The sub-label assigned to images matching the condition of "being adjacent to main images in the same folder" will be referred to as "second label."

Similarly, the image selector 21*c* searches images matching the condition of "resembling the main image," and determines that the searched images are to be sub-labeled with a third label. The resemblance to the main image can be determined in the following manner, for example. That is, a difference in pixel values, or an absolute value of the difference, between the main image and other image is calculated and totaled, and it is determined whether or not the total difference is at or below a threshold value. If the total difference is at or below a threshold value, a resemblance of the two images is determined, whereas a lack of resemblance is determined when the difference is greater than the threshold value. The image selector 21*c* also searches for images matching the condition of "being within a certain time range (such as 3 hours before and after) of when the main image was photographed" and determines that the searched images are to be sub-labeled with a fourth label. The image selector 21*c* also searches for images matching the condition of "belonging to the same electronic album as the album to which the main image belongs" and determines that the searched images are to be sub-labeled with a fifth label.

For image 6, which is the main image in the example in FIG. 4, images 3 and 7 are determined to be assigned a second label, images 2, 3, and 7 are determined to be assigned a third label, images 2 to 5 and 7 to 9 are determined to be assigned a fourth label, and images 1 to 5 and images 7 to 10 are determined to be assigned a fifth label. Images that are to be assigned sub-labels for the other main images (images 31, 33, 35, etc.) in FIG. 3B are determined in the same manner as for image 6.

Here, the conditions used for the assignment of the second through fifth labels are conditions which are very likely to be used as cues when searching for images using the main image as the key. For example when images are searched using image 6 as the key, it is highly possible that the user will search for images cued on the conditions of "being adjacent to image 6", "resembling image 6", "being taken at the same time as image 6", and "included in the same album as image 6." In the example in FIG. 4, images are successively labeled in the order of second label, third label, fourth label, and fifth label, but the invention is not limited to this scenario. The invention is applicable to cases, for example, in which two images are assigned a second label under the condition of "being adjacent to the main image in the same folder", and only one image is assigned a third label under the condition of "resembling the main image."

Returning to FIG. 2, when images that are to be sub-labeled have been determined in Step S220, the main labeler 21a (FIG. 1) writes specific information on the image determined to be a main labeled image in the link file LF and assigns the main label. The sub-labeler 21b writes other specific information on the images determined to be sub-labeled images in the link file LF and assigns the sub-labels (Step S225).

FIG. 5 illustrates exemplary contents of the link file LF. The link file LF is a file that shows which labels have been assigned to which images, and is written in XML (Extensible Markup Language). Only parts relate to image 6 are shown in FIG. 5.

In the example in FIG. 5, a list of file names of images assigned a first label "picnic" and a list of file names of images assigned sub-labels for image 6 above (file name=IMG006.jpg) are written for each sub-label of second through fifth labels. In this way, in the image management system 1000, a list of image file names are written for each label in the link file LF so as to assign labels to the images. In the image management system 1000, when images are deleted from an electronic album, the corresponding image file names are deleted from the list of images in the link file LF. For example, when image 10 in FIG. 4 is deleted from the album A, the file name "IMG010.jpg" for image 10 is automatically deleted from the list of images in the link file LF, whereby the fifth label assigned to image 10 is deleted.

A3. Process for Selecting Images to be Printed

Figure 6:
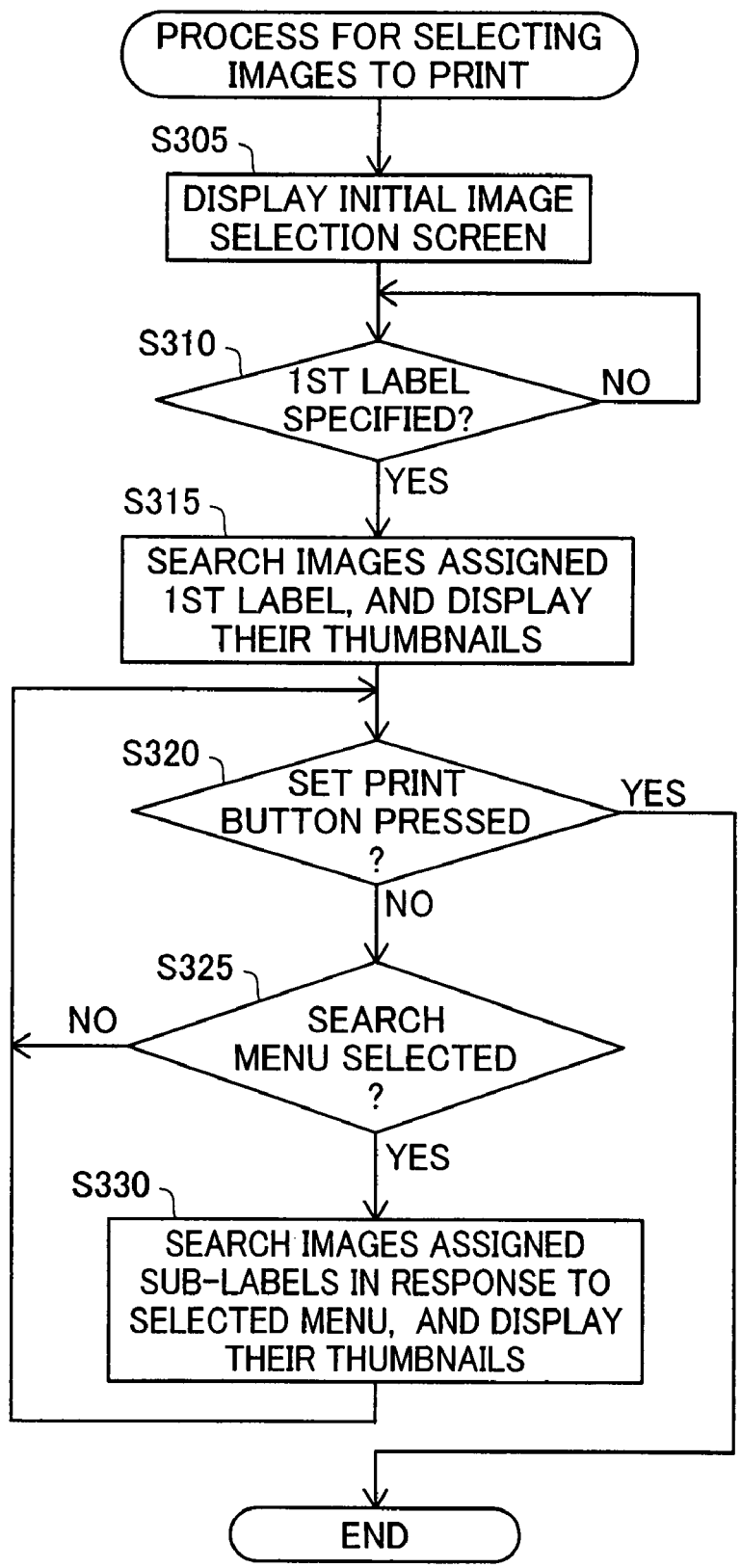
FIG. 6 is a flow chart of the procedure for selecting images to be printed that is run by the image management system.

FIG. 6 is a flow chart of the procedure for selecting images to be printed that is run by the image management system 1000. The image management system 1000 executes the process for selecting images to print when the user selects a "image print selection menu" from the initial menu screen displayed on the display 51 in order to search for and print desired images (some images photographed during a picnic, for example) on the printer 55 (FIG. 1) after the labeling process above has been carried out.

When the process for selecting images to print illustrated in FIG. 6 is started, the display control 23 displays the initial image selection screen on the display 51 (Step S305).

Figure 7:
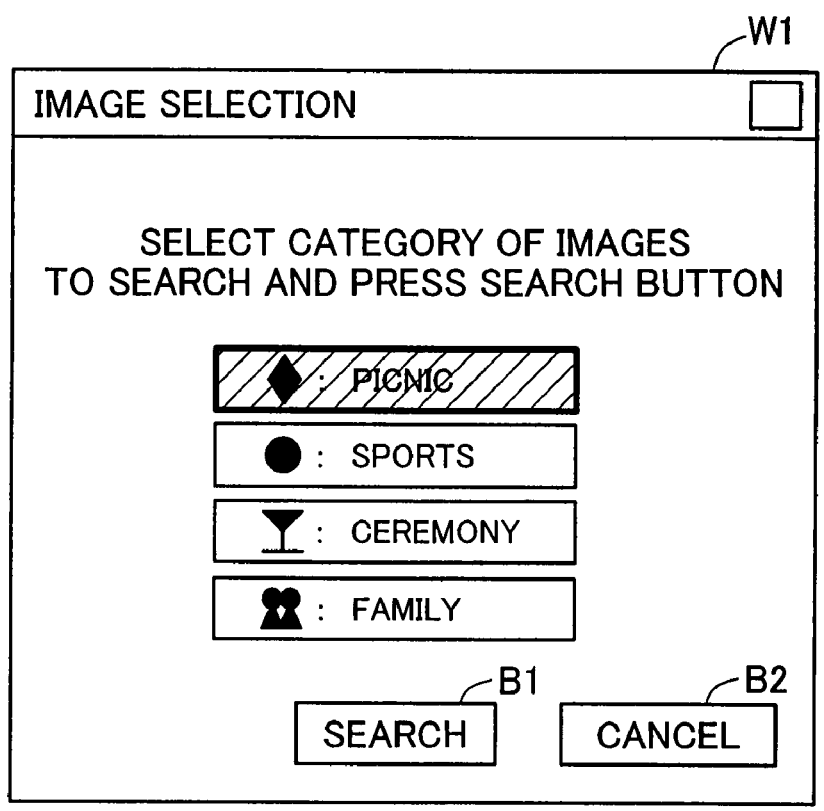
FIG. 7 illustrates the initial image selection screen displayed on the display.

FIG. 7 illustrates the initial image selection screen displayed on the display 51. The initial image selection screen W1 has a search button B1 and a cancel button B2. The initial image selection screen W1 is a screen for indicating the category of the images to be searched, where the user can select the category to which the desired image belongs and press the search button B1 to indicate the category. When searching for "specific images photographed during a picnic" as noted previously, the user can select "picnic." The selectable categories correspond to the first label categories of "picnic," "sports," "ceremony," and "family", and the first label category is specified through the selection by the user.

In Step S305, after the initial image selection screen W1 has been displayed, the image searcher 22 determines whether or not a first label has been specified by the user (Step S310). When the "picnic" first label is specified as above, the image searcher 22 searches for images which have been assigned the first label "picnic" based on the link file LF. The display control 23 allows thumbnails of the images which have been found to be displayed on the display 51 in the form of a search results screen (Step S315).

Figure 8:
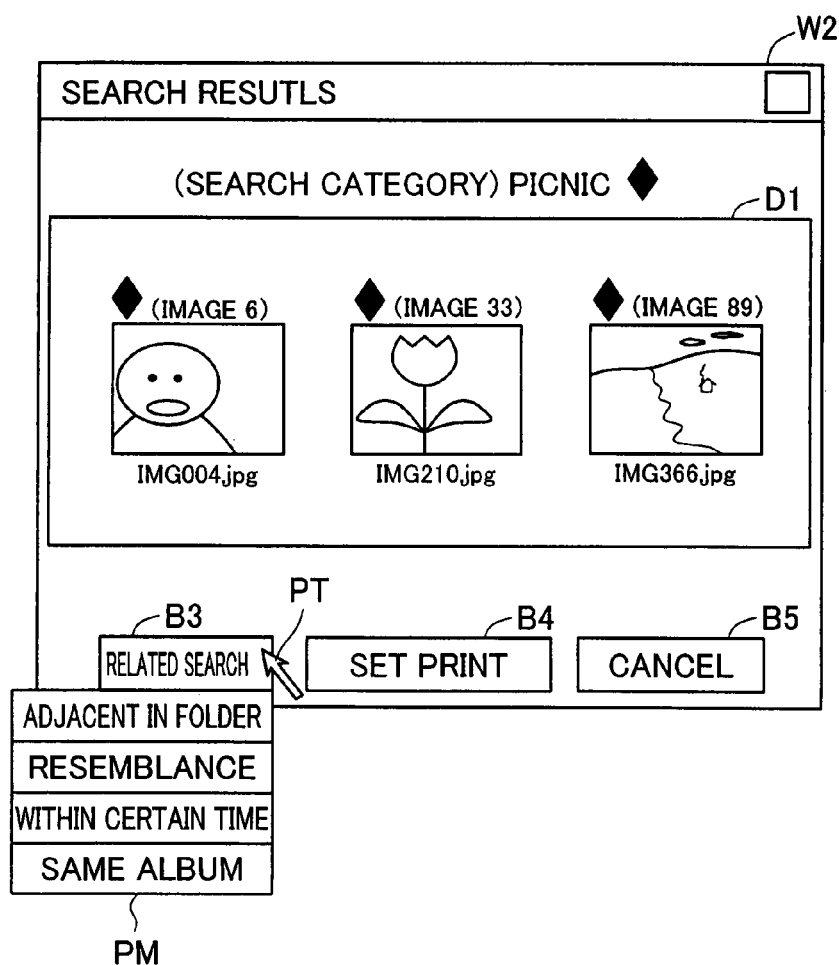
FIG. 8 illustrates the search results screen displayed on the display in Step S315.

FIG. 8 illustrates the search results screen displayed on the display 51 in Step S315. The search results screen W2 has a thumbnail display part D1, related search button B3, set print object button B4, and cancel button B5. The thumbnail display part D1 is an area for displaying thumbnails of images that have been found in Step S315.

As illustrated in FIG. 5, "IMG006.jpg," "IMG210.jpg," and "IMG366.jpg" have been written as file names of images assigned the first label "picnic" in the link file LF. The image 6, image 33, and image 89 with these file names are thus displayed in the thumbnail display part D1.

When the user uses the mouse 53 to select any image in the thumbnail display part D1 and places the on-screen pointer PT on the related search button B3, a pull down menu PM is displayed under the related search button B3. The pull down menu PM displays a search option for searching for related images in the folder ("adjacent in folder" menu), a search option for searching for similar images ("similar" menu), a search option for searching for images within a certain time range ("within certain time range" menu), and a search option for searching for images belonging to the same electronic album ("same album" menu). The user can use the mouse 53 or keyboard 52 to select a desired search option from the pull down menu PM.

After the search results menu W2 has been displayed in Step S315, the display controller 23 determines whether or not the set print object button B4 has been pressed (Step S320) and determines whether or not a search option has been selected (Step S325). When the desired image is found in the images displayed in the thumbnail display part D1, the user can select the thumbnail of the image and can press the set print object button B4 to set the image for printing. In this case, the process for selecting images to print is complete. If, on the other hand, the desired image is not found in the images displayed in the thumbnail display part D1 and an attempt is made to search for images related to any of those images, the user can select a thumbnail and select a search option. The image searcher 22 searches the images assigned second through fifth labels according to the selected search option, and the display control 23 displays thumbnails of the images that have been found on the search results screen W2 (Step S330).

Figure 9:
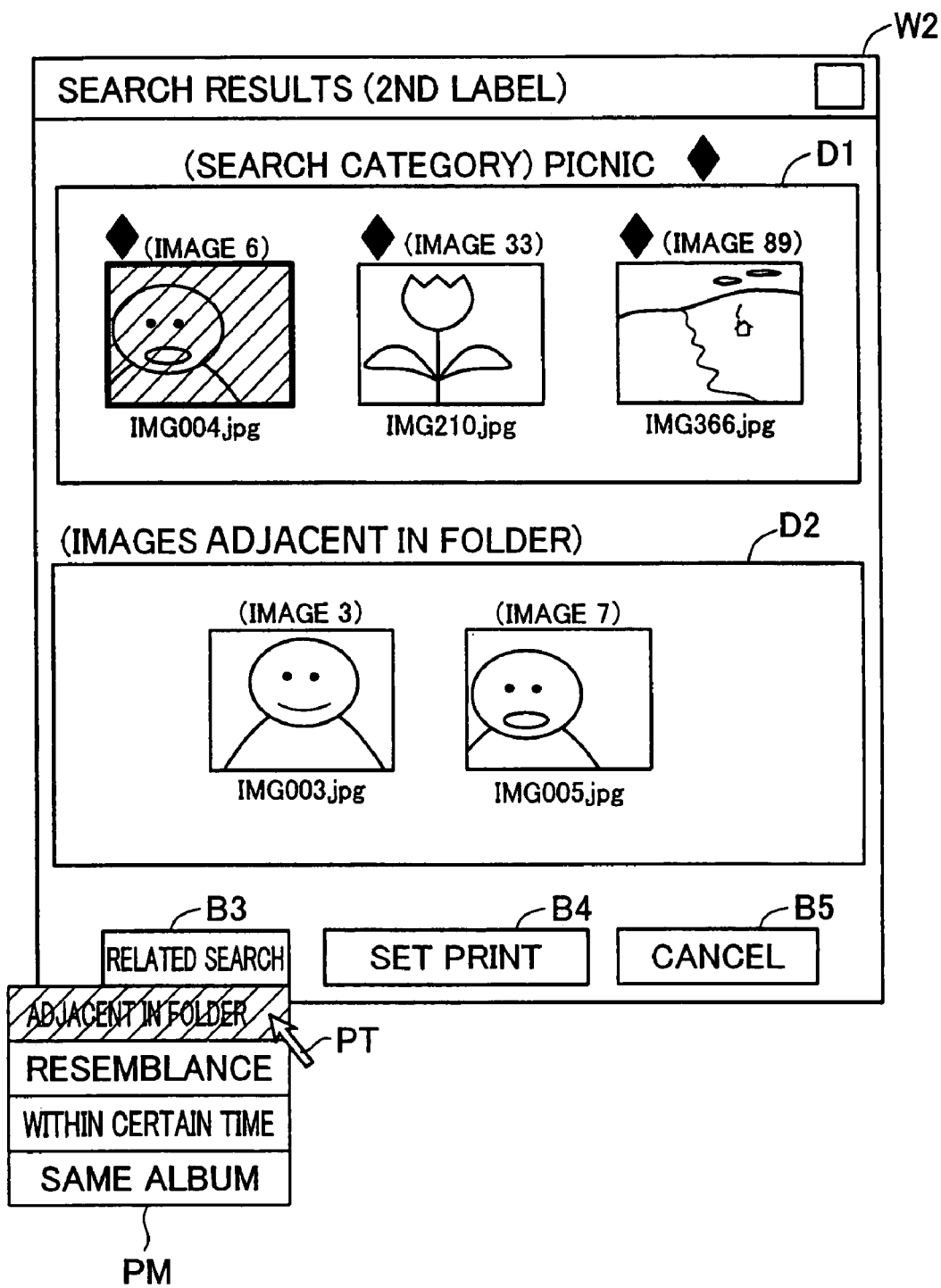
FIG. 9 illustrates the search results screen W2 when image 6 and the "adjacent in folder" menu have been selected on the search results screen W2 illustrated in FIG. 8.

FIG. 9 illustrates the search results screen W2 when image 6 and the "adjacent in folder" search option have been selected on the search results screen W2 illustrated in FIG. 8. A related image display part D2 is also displayed as well as the thumbnail display part D1 in the search results screen W2.

When the user has selected image 6 and has selected the "adjacent in folder" search option, the image searcher 22 searches the images assigned the second label for image 6 based on the link file LF. Since, as illustrated in FIG. 4, the second label is assigned to images 3 and 7 for image 6, the image searcher 22 finds images 3 and 7. Thumbnails of images 3 and 7 are therefore displayed in the related image display part D2. The pull down menu PM may not be displayed at the stage where the search menu was selected, but has been shown for convenience. In this way, thumbnails of images 3 and 7 which are related to image 6 are displayed in the related image display part D2, and the user therefore can determine if either image 3 or 7 is the desired image. However, if neither image 3 nor 7 is the desired image, the user can select another search option to search for the desire image.

Figure 10:
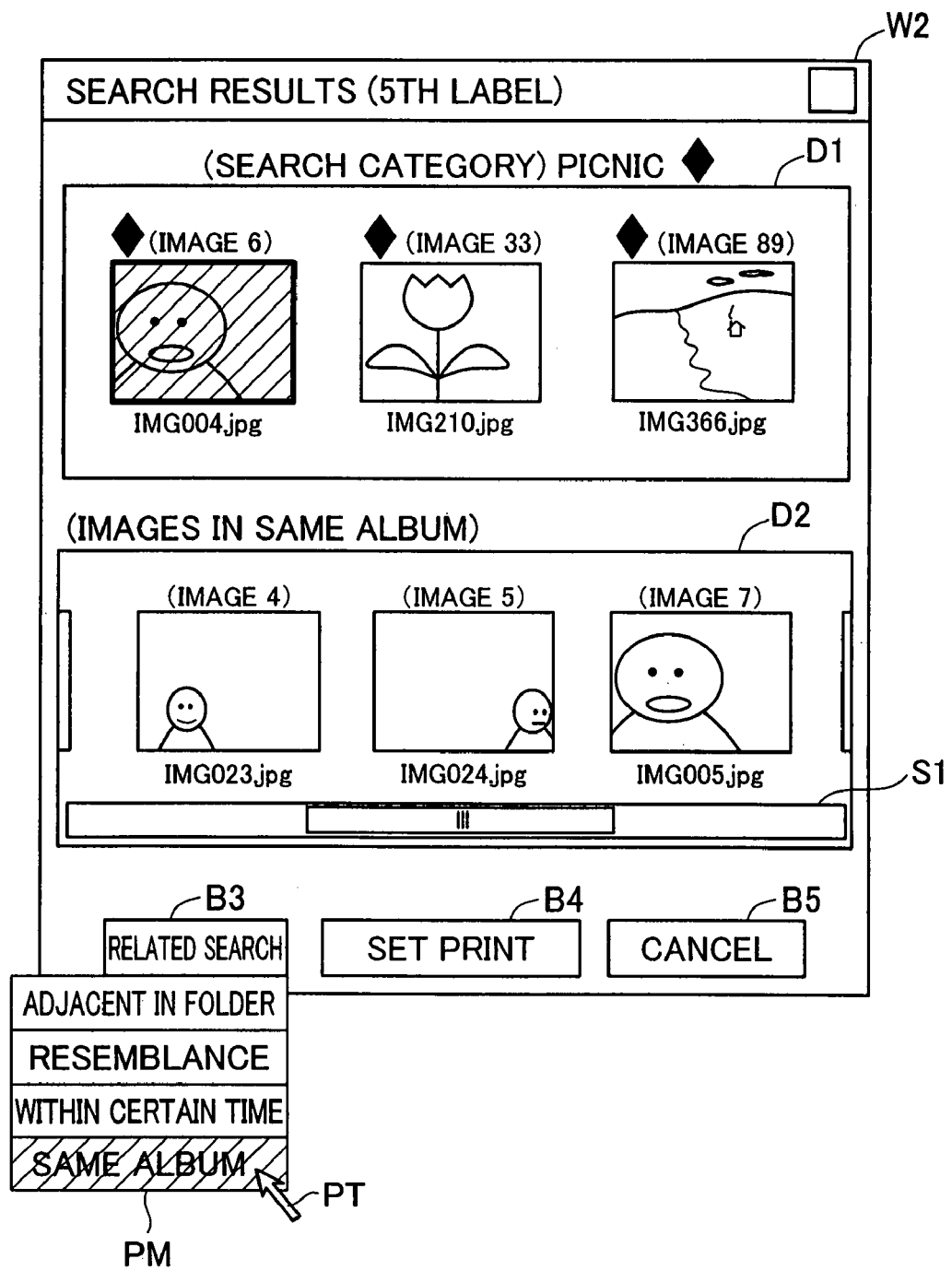
FIG. 10 illustrates the search results screen W2 when image 6 and the "same album" menu have been selected.

FIG. 10 illustrates the search results screen W2 when image 6 and the "same album" search option have been selected. A slide bar S1 is displayed in the related image display part D2. In the example in FIG. 10, the user selects image 6 and the "same album" search option, and the images assigned the fifth label for image 6, that is, images 1 to 5 and images 7 to 10, are displayed in the related image display part D2. The user therefore can operate the slide bar S1 to determine if the desired image is among these nine images.

As noted above, in the image management system 1000, the main label is assigned to an image selected by the user, and sub-labels are automatically assigned to images that are related to the main image. The user can therefore simply assign a first label to some images, so that sub-labels are assigned to images that are related to the main-labeled image, thereby substantially reducing the burden involved in assigning labels.

Also, main labels are assigned only to some images by the user but not to all the images. Fewer images will be thus displayed when searched by category, compared to the case in which main labels are automatically assigned to all images by determining the category of each image through pattern matching or the like. It is thus simpler for users to find a main image which can be used as a key for an image search.

In addition, sub-labels are added to images that are related to the main image, allowing the user to use the main image as a cue in searching for images related to the main image over a broader search range other than the imaged with main labels. Furthermore, the conditions under which sub-labels (second through fifth labels) are assigned are conditions which are all very likely to be used as cues when searching for images keyed on the main image. The user can therefore readily narrow down the images matching conditions that serve as cues when searching images. The user can therefore more rapidly find desired images.

B. Variants

Among the structural elements in the above embodiments, the elements other than those claimed in the independent claims are additional elements and can be omitted. The present invention is not limited to the above examples or embodiments, and can be implemented in a variety of embodiments without departing from the spirit of the invention. The following variants are examples.

B1. Variant 1

In the above embodiments, there are four sub-labels in the form of second through fifth labels, but any number of labels can be used as sub-labels. Other labels may be assigned in addition to the second through fifth labels, or the second labels may be used alone. However, assigning a plurality of sub-labels will allow a broader range of various images related to the main image to be used. The type of sub-labels are also not limited to the above sub-labels such as the one indicating "adjacent to main image in main folder." Labels indicating a match with other conditions such as "taken by the same device as the main image" may also be used. It can be determined whether an image was taken by the same device as the main image based on the ID of the photographic device automatically assigned to image files, such as a digital still camera ID or mobile telephone ID.

B2. Variant 2

In the above embodiments, the main label is selected and assigned by the user, but the main label may also be automatically assigned in the same manner as the sub-labels. For example, the ID of the photographic device that was used can be assigned as the main label to all the images. After the main labels have been assigned, sub-labels such as the one indicating "taken by the same device as main image" may be assigned to images taken by the same device as the main label. In this type of structure, the user has less of a burden in assigning labels, and can indicate the main label to readily search for images taken by the same device as the main image.

B3. Variant 3

In the above embodiment, images assigned main labels and image assigned sub-labels are displayed on the search results screen W2, but images with no labels assigned may be displayed instead. For example, when a "no category designated" search option is added to the initial image selection screen W1 in FIG. 7 and that option is selected, a summary of images with no labels will be displayed. In this way, images with no assigned labels can be displayed to allow the user to readily find unlabeled images for assigning main labels to these images. That is, labeled and unlabeled images may be preferably displayed separately.

B4. Variant 4

In the above embodiments, the image file names are written in the link file LF to assign labels to the images, but the present invention is not limited to this. For example, a sub-label can be assigned to a certain image by creating a label file for the certain image which includes the file name of the main image and the assigned sub-label types (second through fifth).

Figure 11:
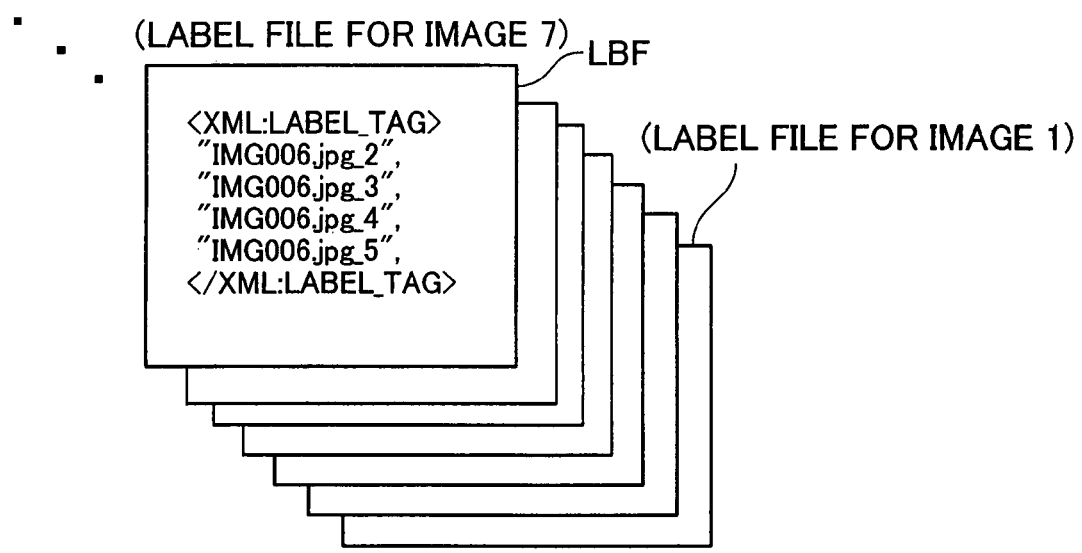
FIG. 11 illustrates the label files in Variant 2.

FIG. 11 illustrates exemplary label files in Variant 2. The label file LBF shows the label file generated for image 7 shown in FIG. 4. As illustrated in FIG. 4, second through fifth labels are assigned to image 7 as sub-labels for image 6. The label file LBF for image 7 describes "IMG006.jpg_2" through "IMG006.jpg_5" indicating the file name of the main image 6 "IMG006.jpg" and the second label "2" through the fifth label "5." Although this is a structure in which label files are produced for each image in this way, when a main image is selected, the image searcher 22 may search for images related to the selected main image based on those label files.

B5. Variant 5

In the above embodiments, images are searched in order to select images that are to be printed, but the present invention is also suitable for searching images in order to select images for applications other than printing. For example, images may be searched based on main labels and sub-labels to select images for display on the display 51.

B6. Variant 6

In the above embodiments, the storage of image data, labeling process, and process for determining images to print are run by a computer 100, but the present invention is not limited to that structure. For example, image data can be stored on a hard disk in a printer, and the CPU in the printer can run certain software to run the labeling processes or processes for determining images to print.

B7. Variant 7

In the above embodiments, labels corresponding to the four categories of "picnic," "sports," "ceremony," and "family" were used as main labels, but the invention is not limited these categories, and labels corresponding to other categories (such as "work" or "recreation") may also be used. For example, labels indicating that images have an appealing pattern may be assigned as main labels instead of labels corresponding to categories. In such cases, images that are to be printed can be readily selected from among images with the appealing pattern and related images.

B8. Variant 8

In the above embodiments, the link file LF is a file written in XML, but the invention is not limited to this, and can include files written in HTML (Hyper Text Markup Language) or plain text files. Such files can be used in various devices without being dependent on hardware or operating systems, in the same manner as XML files.

B9. Variant 9.

Some of the structures realized by hardware in the above embodiments may be substituted by software, and conversely, some of the structures realized by software may be replaced by hardware. Some of the image searcher 22 may be constructed with hardware circuitry, for example.

What is claimed is:

1. An image management device for managing a plurality of images, comprising:

a related image selection module in a CPU, said related image selection module configured to select a related image, wherein the related image has a certain relationship to a main labeled image which is assigned a main label indicating image classification, and is not assigned an auxiliary label indicating the certain relationship between the main labeled image and the related image; and an auxiliary labeling module in a CPU, said auxiliary labeling module configured to assign an auxiliary label to the related image regardless of user's decision about assigning the auxiliary label.

2. The image management device according to claim 1, wherein the certain relationship includes plural types of relationships; and the auxiliary labeling module assigns the auxiliary label to the related image according to the type of relationship to the main labeled image.

3. The image management device according to claim 1, further comprising:

a main labeling module in a CPU, said main labeling module configured to assign the main label to images, wherein the main labeling module assigns the main label to images selected by the user from among the plurality of images.

4. The image management device according to claim 1, further comprising:

a display device; and an image search module in a CPU, said image search module configured to search images using the main label and the auxiliary label, wherein in response to selection of the main labeled image, the image search module searches the related image for the main labeled image based on the auxiliary label, and displays the related image on the display device.

5. The image management device according to claim 1, wherein the auxiliary labeling module creates a label description file describing the main label and the auxiliary label assigned to individual images, separately from image data files of the related image and main labeled image.

6. A method of managing a plurality of images on an image management system comprising a CPU and a memory, comprising the steps of:

(a) selecting a related image, wherein the related image has a certain relationship to a main labeled image which is assigned a main label indicating image classification, and is not assigned an auxiliary label indicating the certain relationship between the main labeled image and the related image; and (b) assigning an auxiliary label to the related image regardless of user's decision about assigning the auxiliary label.

7. The method according to claim 6, wherein the certain relationship includes plural types of relationships; and the step (b) includes assigning the auxiliary label to the related image according to the type of relationship to the main labeled image.

8. The method according to claim 6, further comprising the step of:

assigning the main label to images, wherein the step of assigning the main label includes assigning the main label to images selected by the user from among the plurality of images.

9. The method according to claim 6, further comprising the step of:

searching images using the main label and the auxiliary label, wherein the step of searching images includes, in response to selection of the main labeled image, searching the related image for the main labeled image based on the auxiliary label, and displaying the related image.

10. The method according to claim 6, wherein the step (b) includes creating a label description file describing the main label and the auxiliary label assigned to individual images, separately from image data files of the related images and main labeled image.

* * * * *